(12) United States Patent
Chen et al.

(10) Patent No.: US 7,808,751 B2
(45) Date of Patent: Oct. 5, 2010

(54) DIFFERENTIAL ELECTRICAL SURGE PROTECTION WITHIN A LAN MAGNETICS INTERFACE CIRCUIT

(75) Inventors: John Chen, Danville, CA (US); Steve Contreras, Pleasanton, CA (US)

(73) Assignee: Bel Fuse Inc., Jersey City, NJ (US)

( * ) Notice: Subject to any disclaimer, the term of this patent is extended or adjusted under 35 U.S.C. 154(b) by 758 days.

(21) Appl. No.: 10/833,750

(22) Filed: Apr. 28, 2004

(65) Prior Publication Data

US 2005/0243483 A1 Nov. 3, 2005

(51) Int. Cl.
H02H 3/20 (2006.01)
H02H 9/04 (2006.01)
(52) U.S. Cl. .......................... 361/56; 361/111; 361/91.1
(58) Field of Classification Search ................. 361/111, 361/56, 91.1
See application file for complete search history.

(56) References Cited

U.S. PATENT DOCUMENTS

| | | | | |
|---|---|---|---|---|
| 2,406,615 A | * | 8/1946 | Lensner ........................ | 361/64 |
| 2,408,868 A | * | 10/1946 | Mehring et al. ............... | 361/64 |
| 3,408,536 A | * | 10/1968 | Tibbs .......................... | 315/212 |
| 3,444,434 A | * | 5/1969 | Zocholl ....................... | 361/97 |
| 5,142,429 A | * | 8/1992 | Jaki ............................ | 361/56 |
| 5,796,781 A | * | 8/1998 | DeAndrea et al. ............ | 375/288 |
| 5,989,062 A | * | 11/1999 | Daoud ........................ | 439/532 |
| 6,377,434 B1 | * | 4/2002 | Martineau et al. ........... | 361/119 |
| 7,123,117 B2 | * | 10/2006 | Chen et al. .................. | 333/177 |

OTHER PUBLICATIONS

Syed Mozul Islam, Kathryn M. Coates, Gerard Ledwich Ideintification of High Frequency Transformer Equivalent Circuit Using Matlab from Frequency Domain Data—Oct. 5-9, 1997 IEEE Industry Applications Society—Annual Meeting—New Orleans, Lousiana—pp. 357-364.*
American Wire Gauge and AWG Electrical Current Load Limits. htt://www.powerstream.com/Wire_Size.htm?nowritefs pp. 1-6.*
W. M. Flanagan, Handbook of Traansformer Design & Applications, 1993, 2nd Edition, pp. 1.20-1.21, 10.9-10.19.*

* cited by examiner

*Primary Examiner*—Stephen W Jackson
*Assistant Examiner*—Zeev Kitov
(74) *Attorney, Agent, or Firm*—Ostrolenk Faber LLP

(57) ABSTRACT

A magnetic interface circuit for interfacing between the line side and the circuit side of a communication channel, such as an Ethernet port, includes a transformer having a primary winding connected to the line side of the channel and a secondary winding connected to the circuit side of the channel. The primary winding is fortified to provide differential mode electrical surge protection on the line side. The transformer design having parasitic L, C and R and, saturation during the surge event, acting to suppress the coupling of the electrical surge to the secondary winding. A voltage limiting device is connected in the circuit side of the channel to limit any voltage surges on the circuit side to a safe level. A pair of voltage limiting devices connected in series with the connection therebetween connected to ground may be used to also provide common mode surge protection.

4 Claims, 5 Drawing Sheets

DIFFERENTIAL ELECTRICAL SURGE PROTECTION WITHIN A LAN MAGNETICS INTERFACE CIRCUIT

BACKGROUND OF THE INVENTION

The invention relates generally to protecting data ports on telecommunications equipment against electrical surges and, more particularly, to providing protection against differential electrical surges.

Electrical surges and electrical surge protection applies to a very broad spectrum of different equipment and environments. This invention will be described for exemplary purposes as being directed to electrical surge protection for LAN data ports of Ethernet networking equipment.

The terms "circuit-side" and "line-side" used throughout the specification and claims identifies which side of the isolation transformer is being referred to. These terms are analogous to the terms "primary" and "secondary" sides of transformers, where primary is considered the input to the transformer and secondary is considered to be the output of the transformer. However, the transformers used in magnetics interface circuits are generally bi-directional and each side of the transformer can be either an input or an output, depending on the circumstances. For the purpose of the specification and claims, the term "circuit-side" refers to the side of the transformer that connects to the equipment's electronic circuitry, whereas the term "line-side" refers to the side of the transformer that connects to the data cables.

10Base-T and 100Base-T Ethernet have 2 channels per port while 1000Base-T Ethernet (Gigabite) has 4 channels per port. For the purpose of explanation, only a single channel of an Ethernet port will be described herein for each embodiment of the invention.

A differential electrical surge event is a very fast high voltage/current spike which gets applied differentially across the input/output (I/O) signal pins by direct contact, air discharge, or induction. The most common causes of electrical surges are lightening, static electricity, and cable discharge. There are a number of other type of electrical surges; however, they will not be further discussed herein as they are not relevant to an understanding of the invention.

An electrical surge applied differentially to the I/O pins of the data port channels will be electromagnetically coupled through the isolation transformer and into the transceiver IC where it can cause catastrophic failure, latent failure or degradation in performance of the networking equipment. This is unlike a common-mode electrical surge; which gets applied to all channels in-common. With respect to ground and will not be electromagnetically couple through the isolation transformer.

To achieve effective differential electrical surge protection, there must be some means to clamp or otherwise suppress the voltage of the electrical surge to a safe level. Because an electrical surge can be a high energy event, the protection mechanism must be capable of handling large amounts of current as well.

The prior art employs bulky and expensive bi-directional semiconductor based voltage clamping devices, commonly called transient voltage suppressors (TVS), to provide protection against differential electrical surge events. These devices are placed on the line-side (RJ45 side) of the LAN magnetics interface circuit, one TVS for each channel of the Ethernet port. The TVS-device clamps the voltage of the electrical surge to a safe level and also shunts the very high surge current of the electrical surge away from the magnetics interface circuit.

FIG. 1 shows a block diagram of a prior art circuit for providing differential electrical surge protection for a single channel within an Ethernet port. As illustrated in FIG. 1, the prior art circuit includes a TVS device 10 and a magnetic interface circuit 14 between the line side 12 and the circuit side 16 of the channel. The magnetic interface 14 circuit can be any number of different circuit topologies. As illustrated in FIG. 2, a conventional magnetic interface circuit 14 includes an auto transformer 18, a common mode choke 20, an isolation transformer 22 and a termination network 24 comprising a resistor 26 and a capacitor 28.

There are many disadvantages associated with the prior art. Most of these disadvantages stem from the fact that the TVS device 10 is required to be placed on the line-side (RJ45-side) of the magnetics interface circuit as shown in FIG. 1. As a result, the following list of problems and disadvantages result;

1. The TVS devices must be capable of withstanding the high energy of an electrical surge event; hence they must be physically large in size.

2. The TVS device is very expensive. Since 10/100Base-T Ethernet requires 2 TVS devices per port and 1000Base-T Ethernet requires 4 TVS devices per port, the cost of the TVS devices alone can exceed the entire material and labor cost of the Integrated Connector Module (ICM) in which the LAN data port is housed.

3. The TVS device of the type used in the prior art has a high capacitance because of its large die size and packaging. This capacitance will degrade return loss, insertion loss and other parameters of the magnetics interface circuit and this will impact signal integrity on a system level.

4. The TVS devices, being located on the non-isolated side of the magnetics interface circuit, are subject to safety agency hi-pot (high-potential) requirements. Hence, all of the TVS components, conductive surfaces and the associated interconnecting wiring must have adequate clearance (spacing) away from any ground referenced conductors. This creates many problems in terms of the physical placement of the TVS devices, the length and routing of the interconnection wiring and/or the layout of the internal PCB (Printed Circuit Board). This can also have adverse affects on other electrical performance issues.

5. The large size of the TVS device also causes a host of other problems:

a. There is very little room available within the ICM to place multiple large TVS devices, particularly because they must be placed close to the RJ contact pins in order to be effective. This usually requires an increase in the size of the ICM or requires larger or additional internal PCBs and/or structures to accommodate the TVS devices, adding significant cost and design complexity.

b. The interconnecting wiring associated with the large TVS devices requires additional space (besides that needed to accommodate the large TVS devices themselves), making wiring and/or PCB layout difficult. Additionally, electrical performance problems may arise if the interconnecting wiring and/or layout of the PCB are not properly done.

c. The large size and limited selection of device packages makes implementation of surge protection into existing designs highly problematic, if not impossible, and also makes the mechanical and electrical design of new products more difficult, which can lengthen the design cycle and time to market.

6. The circuit configuration of FIG. 1 does not provide protection against common-mode surge events. Hence, additional protection devices are required.

7. The TVS device is connected in parallel with the line-side of the magnetics circuit and, therefore, part of the high current associated with the surge event will flow through the winding(s) of the magnetics. This can cause damage to the wire or open circuits, latent failure, or degradation in performance. The extent to which this is a problem depends heavily on the type of TVS used, the interconnecting wiring, and the design of the magnetics interface circuit.

SUMMARY OF THE INVENTION

The invention has three major objectives:

1) To eliminate the need for large expensive TVS devices located on the line-side of the transformer in order to reduce cost and avoid all of the associated problems and disadvantages associated therewith.

2) To take advantage of the inherent characteristics of the isolation transformer to allow the use of very small, low cost voltage limiting component(s) on the circuit-side of the transformer to provide electrical surge protection.

3) To be highly adaptable and have the ability to provide different types and levels of surge protection as warranted by the application.

These and other objects of the invention are realized in a magnetic interface circuit which includes a transformer having a primary winding connected to an input circuit and a secondary winding connected to an output circuit. The primary winding is fortified to provide protection against differential mode electrical surges on the primary side of the transformer. A voltage limiting device is connected in the output circuit to limit any voltage surges on the secondary side of the transformer.

In accordance with an aspect of the invention, a pair of voltage limiting devices connected in series with the connection therebetween being connected to ground may be used on the secondary side to also provide common mode surge protection.

Other features and advantages of the present invention will become apparent from the following description of the invention which refers to the accompanying drawings.

BRIEF DESCRIPTION OF THE DRAWING(S)

DETAILED DESCRIPTION OF THE PREFERRED EMBODIMENT(S)

Figure 1:
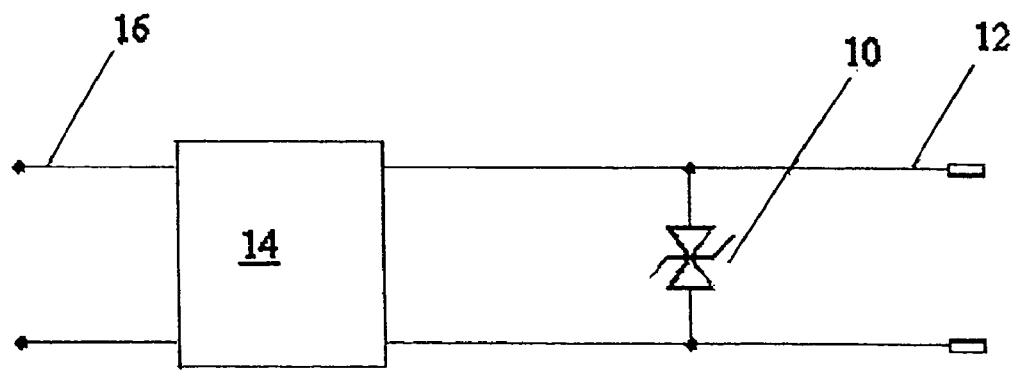
FIG. 1 shows schematically a prior art implementation of electrical surge protection on an Ethernet LAN port.
Figure 2:
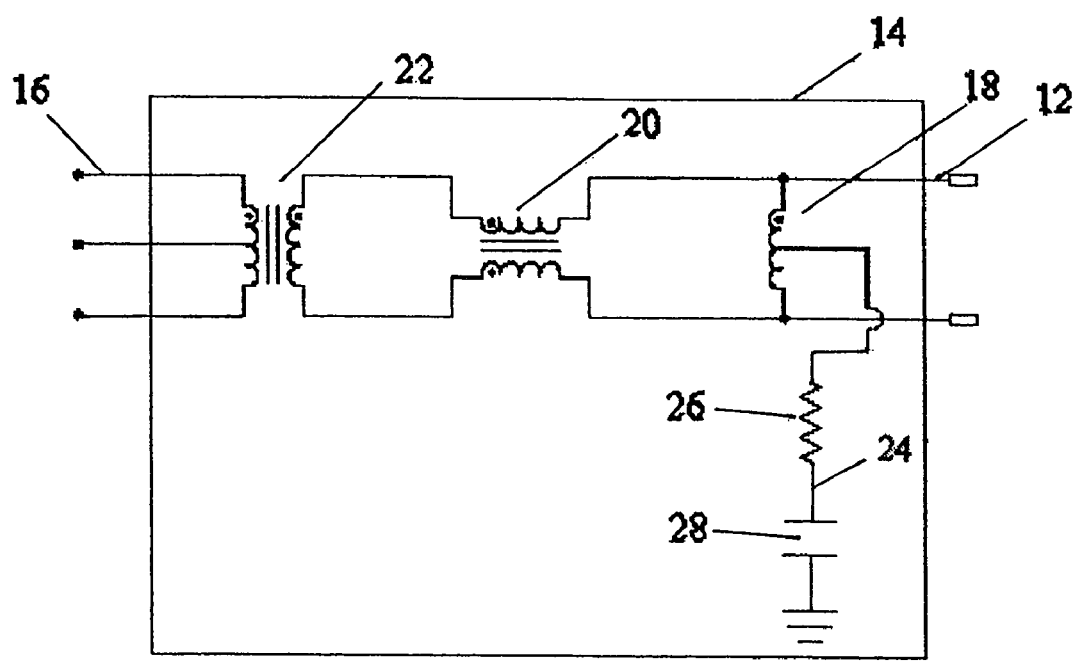
FIG. 2 is a schematic diagram of a conventional LAN magnetics interface circuit.
Figure 3:
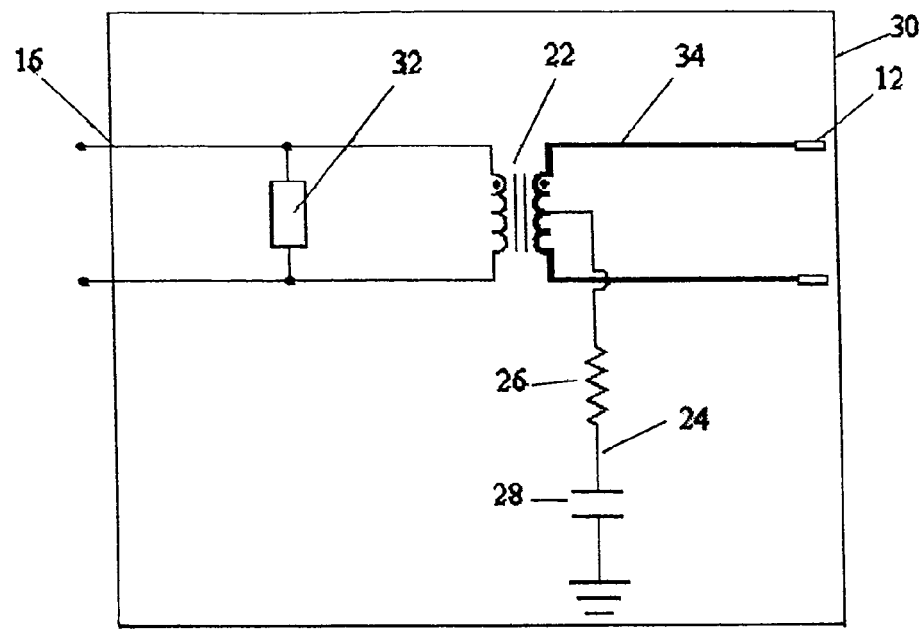
FIG. 3 is a schematic diagram of a magnetic interface circuit with electrical surge protection in accordance with certain principles of the present invention.

FIG. 3 shows a magnetics interface circuit 30 which includes an isolation transformer 22, a single voltage/limiting/clamping device 32 and a termination network 24.

The termination network 24 shown in FIG. 3 and the following Figs. is not required for practice of the invention and may or may not be used in a magnetics interface circuit in accordance with the present invention.

Without a TVS on the line-side 12 of the magnetics interface circuit 30, it is vulnerable to damage from the high current associated with an electrical surge event. Hence, the first fundamental element of the new topology illustrated in FIG. 3 is to fortify the line-side of the magnetics interface circuit 30 in order to prevent damage to the circuit that will otherwise occur as a result of the high surge current that will flow during a differential electrical surge event. This is accomplished by increasing the current carrying capability of the line-side 12 of the magnetics interface circuit 30 such that it will absorb the bulk of the energy of the electrical surge event without damaging the circuit. The easiest way to do this is to simply increase the wire size (gauge) of the line-side current carrying elements of the magnetics interface circuit. In FIG. 3 and the following figures, this is represented by the bold lines that are identified as fortified wiring 34.

The term "fortified winding" as used herein means a winding which has an increased current carrying capacity such that it will not be damaged as a result of electrical surge events. This can be achieved in many different ways. The following are some examples of a fortified winding 34:

1) For the magnetic interface circuits depicted in FIGS. 3-9, the normal (not-fortified) range of magnet-wire gauge is (but not limited to) AWG #38 through AWG #41. The fortified magnet-wire 34 range is AWG #32 to #37. The wire gauge of the circuit-side of the transformer 22 does not necessarily have to be the same as the wire gauge of the fortified winging 34.

2) For the magnetic interface circuits depicted in FIGS. 3-9, the normal (non-fortified) range of magnet-wire gauge is (but not limited to) AWG #38 through AWG #41. To achieve fortification of the line-side winding, two or more wires of the normal size or smaller can be used in parallel (multi-strand) to effectively increase the overall current carrying capacity of the winding. For example, two AWG #39 wires in parallel could be used instead of a single strand of AWG #36. Similarly, three strands of AWG #40 will give the same current carrying capacity of a single strand of AWG #35.

With the line-side 12 of the transformer 22 fortified with a fortified winding 34, there is still a need to provide a means to clamp or suppress the transient voltage that will couple to the circuit-side of the transformer. To accomplish this function, this invention takes advantage of the fact that the isolation transformer 22 is not effective in coupling transient signals in the nature of an electrical surge event. This is partly due to the parasitic (unwanted) elements that are inherent in any transformer. These parasitic elements, which include various forms of series and parallel inductance, capacitance, resistance, and core losses, drastically limits the ability of the transformer 22 to couple a fast transient event such as an electrical surge.

Of greater importance is the fact that the transformer core will rapidly saturate an instant after the beginning of an electrical surge as a result of the high current flow in the line-side winding. With the core saturated, there will be no "transformer action"; meaning that the saturated transformer is incapable of inducing voltage (or current) on the circuit-side winding. The net result of the parasitic elements and the core saturation is that the surge voltage and current that is coupled across the transformer 22 to the circuit-side 16 will be orders of magnitude less than that of the actual electrical surge. This is very significant in that it allows the use of a small low cost component(s) 32 to clamp or suppress the voltage pulse that will appear on the circuit-side of the isolation transformer 22 during an electrical surge event.

The fact that the electrical surge which appears on the circuit-side 16 of the transformer 22 is of far less voltage and current (energy) than that of the of the line-side 12 allows using a small, low cost voltage clamping or limiting devise(s) 32 on the circuit-side of the transformer 22 to limit the surge to a safe level, if not eliminate it completely. The components used to provide this final stage of protection can be small, low cost polymer TVS(s), clamping diode(s), or even low value capacitor(s). The type of component used depends on the level of protection required and other factors of the magnetics circuit design. It can also be a combination of different devices. Of key importance here is that these components are much lower in cost, much smaller in size and have a much lower amount of capacitance compared to the large TVS of prior art. Less capacitance is very important because there will be less detrimental effect on the circuit performance.

The fundamental concepts of the invention apply to any type of magnetics interface circuit topology.

Figure 4:
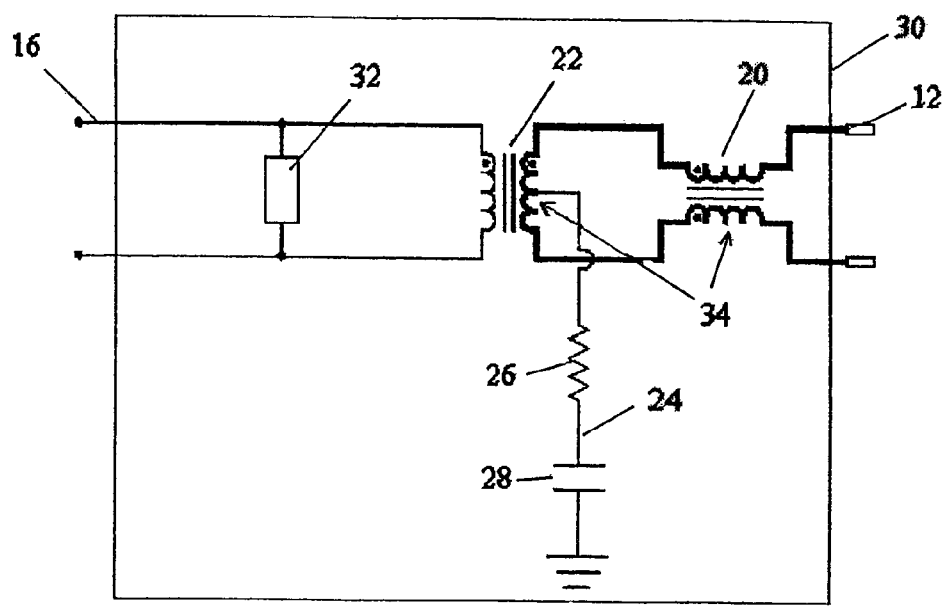
FIG. 4 is a schematic diagram of electrical surge protection in a two-core magnetic interface circuit with a common-mode choke on the line side of an isolation transformer in accordance with certain principles of the invention.

FIG. 4 illustrates electrical surge protection in accordance with certain principles of the present invention incorporated in a two-core magnetic interface circuit 30 with a common-mode choke (CMC) 20 and a fortified winding 34 on the line-side 12 of the isolation transformer 22.

Figure 5:
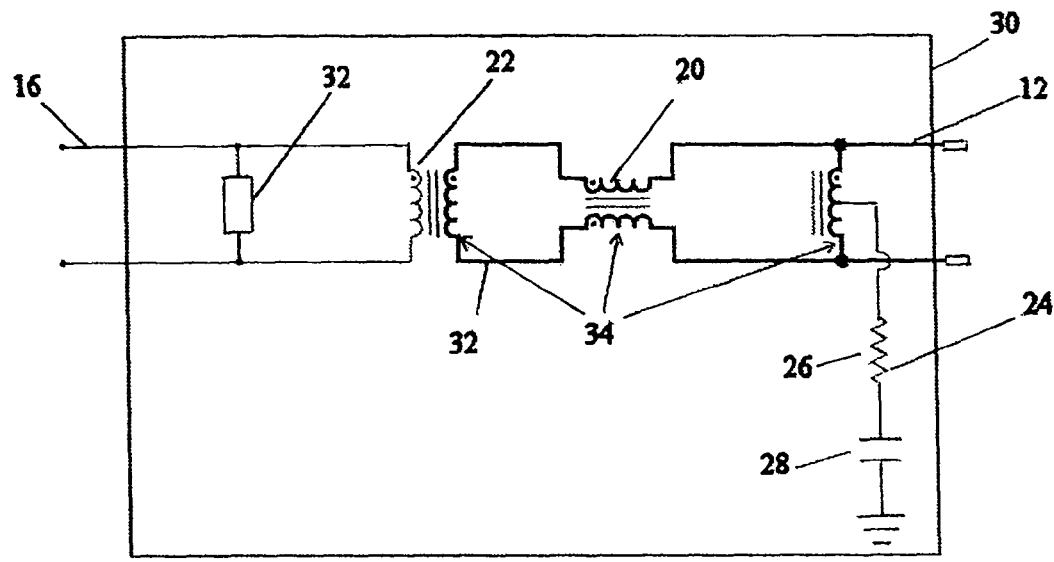
FIG. 5 is a schematic diagram illustrating electrical surge protection in a three-core magnetic interface circuit with a common-mode choke and an autotransformer on the line-side of the isolation transformer in accordance with certain principles of the invention.

FIG. 5 illustrates electrical surge protection in accordance with certain principles of the present invention incorporated in a three-core magnetic interface circuit 30 with a CMC 20 and an autotransformer 36 having a fortified winding 34 on the line-side 12 of the isolation transformer 22.

Figure 6:
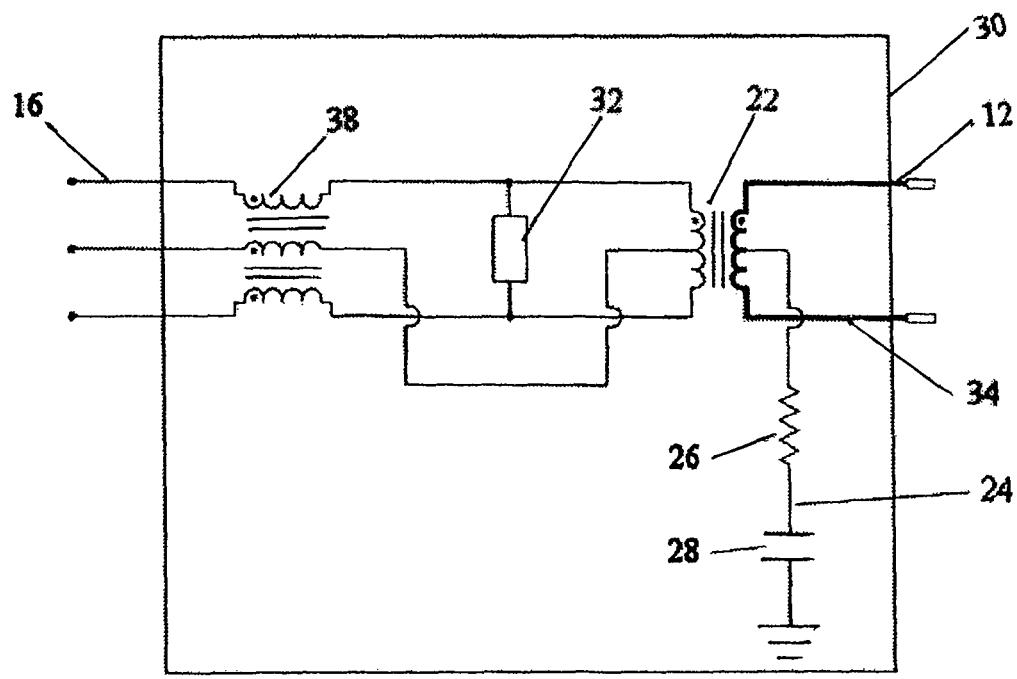
FIG. 6 is a schematic diagram illustrating electrical surge protection in a two-core magnetic interface circuit with a 3-wire common-mode choke on the circuit-side of the isolation transformer in accordance with certain principles of the present invention.

FIG. 6. Illustrates surge protection in accordance with certain principles of the present invention incorporated in a two-core magnetic interface circuit 30 with a 3-wire CMC 38 on the circuit-side 16 of the isolation transformer 22 and a fortified winding 34 on the line side 12.

Standard LAN magnetic interface circuits, such as the Bel Fuse MagJack™ series of integrated connector modules, are already well suited to withstand the applicable common-mode (longitudinal) electrical surge events defined by GR-1089. However, there usually must be some additional surge protection (in the case of this invention, located on the circuit-side of the transformer) to protect the system electronic circuitry downstream.

The following figures show variations of the invention which provides both differential and common-mode electrical surge protection. This is accomplished by simply utilizing two voltage limiting/clamping devices 32 in series with the center tied to ground as shown.

One of the key advantages here is that the protection devices connected to ground do not have any Hi-pot (high potential) considerations since they are located on the isolated side (i.e., the circuit side 16) of the circuit. Additionally, the series connected devices 32 will have half the capacitance of the individual device 32, as seen by the differential signal line.

Figure 7:
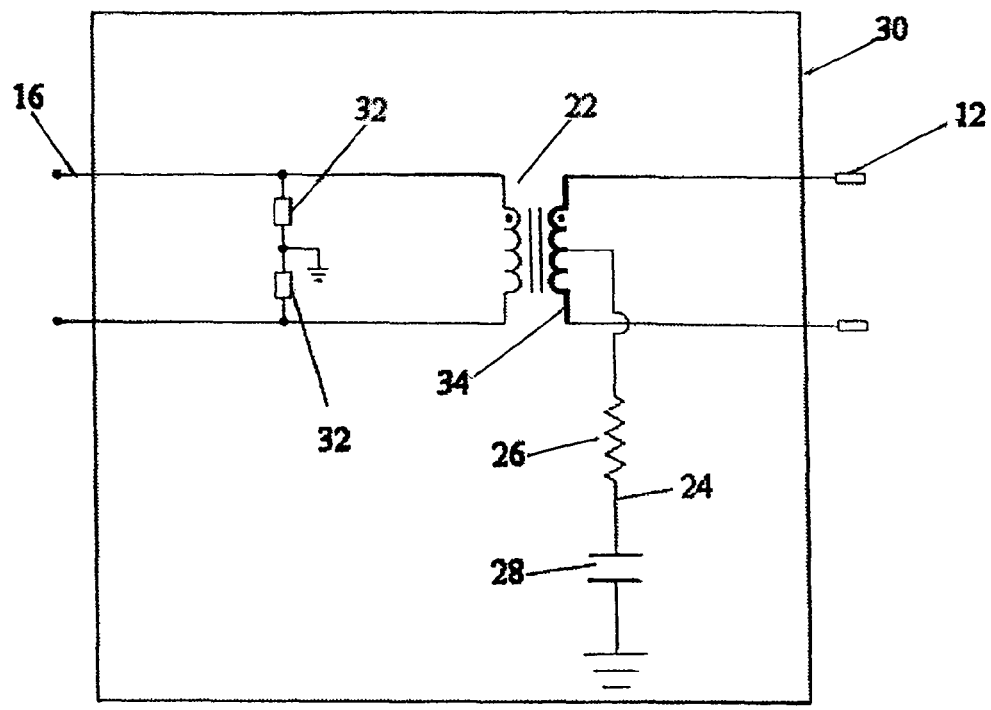
FIG. 7 is a schematic diagram illustrating a single transformer interface circuit with differential mode and common-mode electrical surge protection in accordance with certain principles of the present invention.

FIG. 7 illustrates a magnetic interface circuit 30 in accordance with certain principles of the present invention which includes an isolation transformer 22 having a fortified winding 34 to provide differential-mode electrical surge protection and series connected devices 32 to provide common-mode electrical surge protection.

Figure 8:
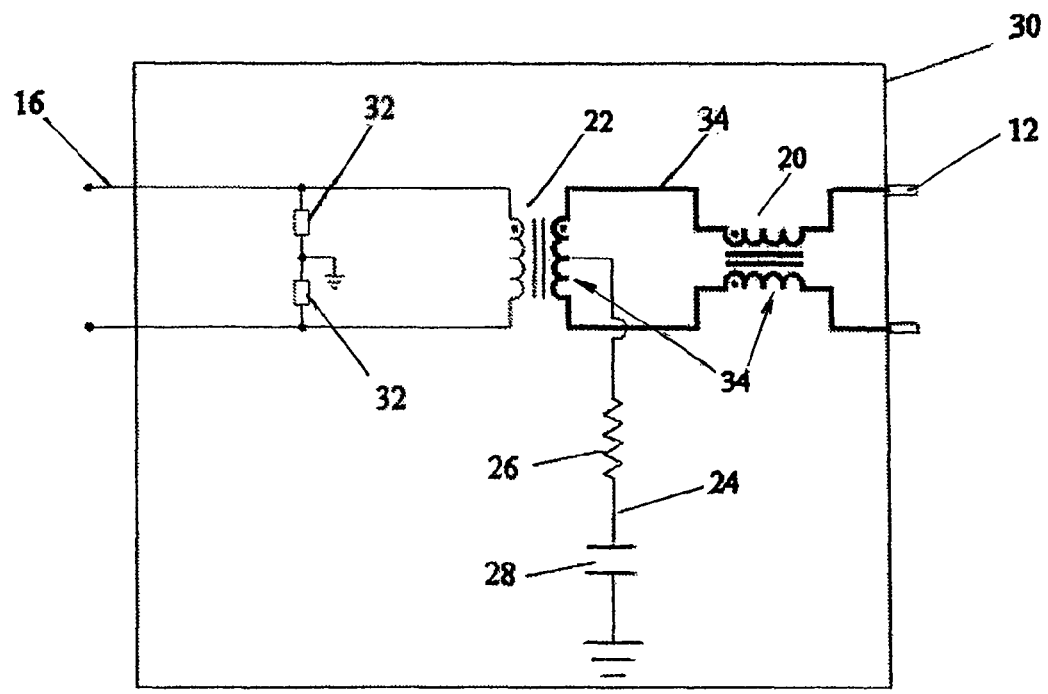
FIG. 8 is a schematic diagram illustrating a single transformer and line-side common-mode interface circuit with differential mode and common-mode electrical surge protection is accordance with certain principles of the present invention.

FIG. 8 illustrates a magnetic interface circuit 30 in accordance with certain principles of the present invention having an isolation transformer 22 and a line side CMC 20 with a fortified winding 34 to provide differential mode electrical surge protection and series connected devices 32 to provide common-mode electrical surge protection.

Figure 9:
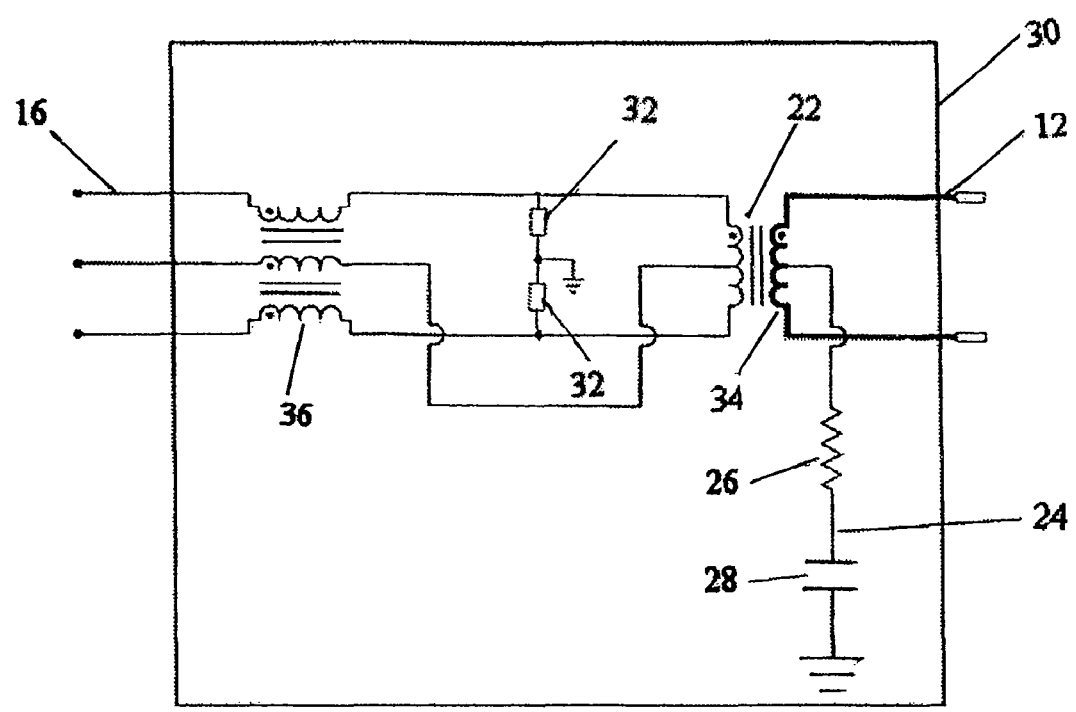
FIG. 9 is a schematic diagram of a two-core magnetic interface circuit with a 3-wire common-mode choke on the circuit side of the isolation transformer with differential mode and common-mode electrical surge protection.

FIG. 9 illustrates a two-core magnetic interface circuit in accordance with certain principles of the present invention having an isolation transformer 22 and a 3-wire CMC 36 with fortified windings 34 on the circuit-side 16 to provide differential-mode electrical surge protection and series connected devices 32 to provide common-mode electrical surge protection.

If desired, one or more additional low cost components 32 may be incorporated on the circuit-side 16 of the embodiments of FIGS. 3-9 to provide a more robust level of electrical surge protection.

Some of the key advantages of the new magnetic interface circuits 30 with surge protection are as follows:

1) Utilization of the low resistance of the fortified wiring 34 instead of a TVS device to handle the high current and absorb the bulk of the energy of the electrical surge event.

2) Utilization of the parasitic L, C, and R inherent in the isolation transformer 22 and, the fact that the transformer 22 will saturate during the surge event, as a fundamental part of the surge suppression mechanism.

3) Utilization of small, lower cost voltage limiting/clamping components 32 on the circuit-side 16 of the isolation transformer 22.

4) Enables a variety of different kinds of components to be used for the voltage limiting/clamping device(s) 32.

5) Has far lower overall cost compared to the prior art.

6) Are applicable with any type on magnetic interface circuit.

7) Highly adaptable to different levels of protection.

8) Easier to design into existing packages with little or no new tooling required.

9) Fewer mechanical and electrical design challenges for new designs.

10) No Hi-pot issues with the surge protection components.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A magnetic interface circuit which comprises:
a transformer having a first winding connected to an input circuit and a second winding connected to an output circuit, the first winding being fortified to provide protection against differential mode electrical surges on the input circuit side of the transformer; the transformer having parasitic inductance, capacitance and resistance and, saturating during a differential mode electrical surge, the parasitic inductance, capacitance and resistance and the saturation of the transformer acting to suppress the coupling of the electrical surge to the second winding; and at least one voltage limiting device connected in the output circuit to limit any voltage surges on the output circuit side of the transformer to a safe level, wherein there are three circuit side terminals and further including a three winding common mode choke, the voltage limiting device being connected to respective first and second ones of the circuit side terminals via respective first and second ones of the three windings of the three winding common mode choke and the third winding of the three winding common mode choke being connected to the third one of the circuit side terminals and to the second winding of the transformer.

2. A magnetic interface circuit according to claim 1 further including a second voltage limiting device, the two voltage limiting devices being connected in series with the connection between the two voltage limiting devices being connected to ground to thereby provide protection against common-mode electrical surges.

3. A magnetic interface circuit for interfacing between the line side and the circuit side of a communication channel, which magnetic interface circuit comprises:

a transformer having a first winding connected to the line side of the channel and a second winding connected to the circuit side of the channel, the first winding being fortified to provide protection against differential mode electrical surges on the line side of the channel; and the transformer having parasitic inductance, capacitance and resistance and, saturating during a differential mode electrical surge, the parasitic inductance, capacitance and resistance and the saturation of the transformer acting to suppress the coupling of the electrical surge to the second winding;

at least one voltage limiting device connected in the circuit side of the channel to limit any voltage surges on the circuit side of the channel to a desired safe level, wherein there are three circuit side terminals and further including a three winding common mode choke, the voltage limiting device being connected to respective first and second ones of the circuit side terminals via respective first and second ones of the three windings of the three winding common mode choke and the third winding of the three winding common mode choke being connected to the third one of the circuit side terminals and to the second winding of the transformer.

4. A magnetic interface circuit according to claim 3 further including a second voltage limiting device, the two voltage limiting devices being connected in series with the connection between the two voltage limiting devices being connected to ground to thereby provide protection against common-mode electrical surges.

* * * * *